Feb. 19, 1935.　　　D. P. MOSSMAN　　　1,992,128

LANTERN SLIDE AND METHOD OF MAKING THE SAME

Filed July 11, 1931

Donald P. Mossman
INVENTOR by H. Z. Lord
ATTORNEY

Patented Feb. 19, 1935

1,992,128

UNITED STATES PATENT OFFICE 1,992,128

LANTERN SLIDE AND METHOD OF MAKING THE SAME

Donald P. Mossman, Meadville, Pa., assignor to Keystone View Company, Meadville, Pa., a corporation of Pennsylvania Application July 11, 1931, Serial No. 550,172

3 Claims. (Cl. 41—27)

Lantern slides have ordinarily heretofore been made by forming the ordinary black and white photographic plate and applying the colors corresponding to the colors of the lantern slide on this plate. The present invention is designed to improve the plate and the method of forming the same and broadly consists in forming the original plate photographically of a color tone corresponding to a tone of the subject presenting either the dominant, or more intricate part of the color scheme. The remaining colors corresponding to the colors of the subject are then applied selectively and manually in the usual manner. In this way much of the labor of applying the colors may be eliminated and the lantern slide is quite definitely improved not only because of the more accurate reproduction of the dominant color, but also from the fact that the color tones, such as the browns, yellows and reds make the slide less opaque than the ordinary black and white photographic plate and consequently the coloring need be less densely applied and the slide as a whole thus gives a more brilliant effect. Features and details of the invention will appear from the specification and claims.

An example and preferred embodiment of the invention is illustrated in the accompanying drawing as follows:—

Figure 1:
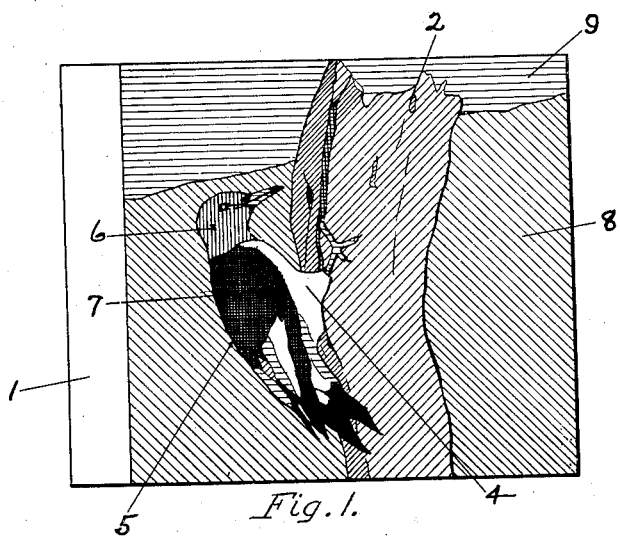

Fig. 1 shows an elevation of a finished slide.

Figure 2:
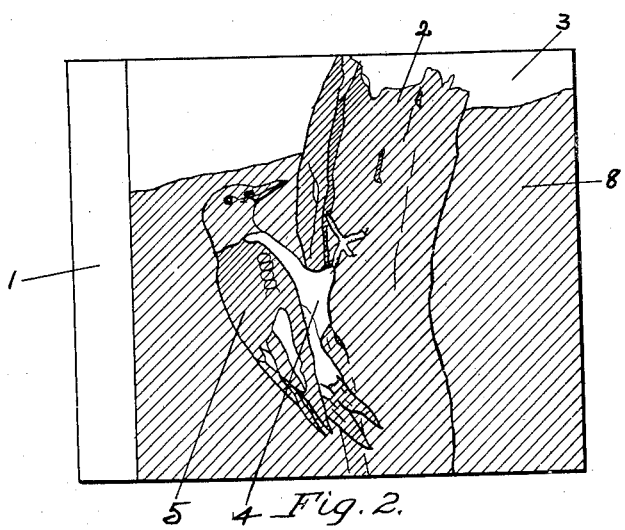

Fig. 2 an elevation of the same slide having the tone color base.

In the illustration, 1 marks the slide. In the subject shown, the dead tree trunk 2 is the dominant color feature of the subject and the basic color of the plate being formed in sepia gives a very realistic reproduction of this color tone without retouching. The sky white 3 and the white 4 of the woodpecker 5, of course, remain constant in the preparatory plate and the finished slide. The head 6 of the woodpecker is colored red and the black portions 7 of the body are similarly added. The general background is given a green cast 8 and the sky is toned blue at 9.

By this method the part having the most intricate, or dominant color tone may be chosen for the photographic plate. As before stated, this immediately eliminates any treatment of these parts of the plate. At the same time, these color tones, as distinguished from the black and white are very much less opaque and consequently the color scheme as a whole may be made more nearly true to the subject.

What I claim as new is:—

1. The method of forming lantern slides which consists in forming a photographic plate having a color tone corresponding to a color tone of the subject, and manually coloring the plate with the remaining colors.

2. The method of forming lantern slides which consists in forming a photographic plate having a color tone corresponding to a dominant color tone of the subject and manually coloring the plate with the remaining colors.

3. A lantern slide glass plate having a photographic color tone corresponding to the color tone of a part of the subject and non-photographic color parts completing the subject.

DONALD P. MOSSMAN.